Nov. 12, 1968    C. ZELNICK    3,409,988

MEASURING TAPES AND METHODS OF MAKING SUCH TAPES

Original Filed March 7, 1962

FIG. 4-A

INVENTOR.
CHARLES ZELNICK
BY
*Learman, Learman, & McCulloch*
ATTORNEYS

United States Patent Office 3,409,988
Patented Nov. 12, 1968

3,409,988
MEASURING TAPES AND METHODS OF
MAKING SUCH TAPES
Charles Zelnick, Saginaw, Mich., assignor, by mesne assignments, to Cooper Industries, Inc., Houston, Tex., a corporation of Ohio
Continuation of application Ser. No. 178,181, Mar. 7, 1962, which is a continuation-in-part of application Ser. No. 78,592, Dec. 27, 1960. This application Feb. 11, 1966, Ser. No. 526,811
12 Claims. (Cl. 33—137)

ABSTRACT OF THE DISCLOSURE

A measuring tape and the method of producing such tape which comprises an elongated strip of thermoplastic film which is stretched and heat set in the stretched condition and in a concavo-convex form.

This application is a continuation of application Ser. No. 178,181 filed Mar. 7, 1962, now abandoned, which is a continuation-in-part of application Ser. No. 78,592 filed Dec. 27, 1960, now abandoned.

This invention relates to measuring tapes and more particularly to flexible tape lines formed of a thermoplastic film strip which have excellent dimensional stability.

One of the principal objects of the invention is to provide a plastic film tape line comparable to conventional woven type tapes which can be produced at great savings because weaving costs are eliminated. It is a prime object of the invention to produce a tape of this character which has remarkable dimensional stability when wet, as well as when dry, which is sufficiently flexible so that it can be creased or sharply bent without fracturing or deforming the tape, and which is sufficiently resilient so that it returns to the dimension at which it has been thermally set, if it is stretched.

Another principal object of the invention is to provide a measuring tape which can be simply fabricated from a plastic film strip and heat set with a transverse curvature providing a rigidity heretofore associated with coilable metal tape lines.

A further object of the invention is to provide a measuring tape which has great tear strength, excellent resistance to abrasion, and a negligible moisture absorptivity.

A further object of the invention is to provide a tape having smooth surface characteristics which will tend to slide over and avoid obstructions and will not readily pick up dirt.

Another object of the invention is to provide a tape which has great tensile strength and a low elongation factor when wet, as well as when dry, is resistant to ultraviolet light or sunlight, is insoluble and unaffected by most chemicals, and resists deterioration due to the action of microorganisms and insects.

Still a further object of the invention is to design a wrinkle resistant tape which has the excellent wear qualities of some woven tapes but can be much more economically manufactured.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawings:

FIGURE 4A is a transverse, sectional view taken on the line 4A—4A of FIGURE 3;

Figure 1:
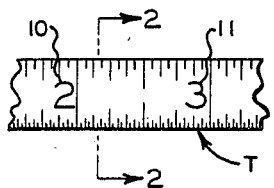
FIGURE 1 is a plan view of a measuring tape formed in accordance with the invention.
Figure 6:
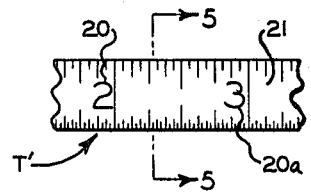
FIGURE 6 is a reduced, fragmentary, top plan view thereof.
Figure 2:
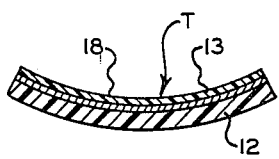
FIGURE 2 is an enlarged, transverse sectional view taken on the line 2—2 of FIGURE 1.

Referring now more particularly to the accompanying drawings, in which I have shown preferred forms of my invention, the letter T generally indicates a finished tape line, which is shown in FIGURES 1 and 2 as provided with indicia including graduations 10 and numerals 11.

A novel method of making the tape T will be set forth and in the first instance only the tape shown in FIGURE 1 will be described.

The tape generally identified by the letter T includes an elongated, narrow base strip 12 which, in the form of the invention shown in FIGURES 1 and 2, has a pigmented coating 13 applied to the upper face thereof. In the embodiment illustrated, the base strip 12 is a length of polyethylene terephthalate film which may be fifty or more feet in length. This film, which is commercially known as "Mylar" film, is the amorphous condensation polymer resulting from the well known esterification reaction between ethylene glycol and terephthalic acid or the alcoholysis of a terephthalic acid ester with ethylene glycol.

After extrusion in film form in relatively wide sheets in a thickness in the range .008 to .020 of an inch the film is continuously longitudinally stretched at a rate of at least 400% per minute from 2.5 to 3.25 times its original length in the longitudinal direction at a temperature within the range of 80° C. to 90° C. Thereafter, the film is stretched in the transverse direction at a rate of at least 400% per minute to substantially the same extent at a temperature within the range 95° C.–110° C. Finally, the biaxially stretched film is heat set in this stretched condition at a temperature within the range of 200° C.– 250° C. The stretching in both directions can be accomplished with conventional tensioning rolls of well known design which maintain the stretched condition while the film is passed through a suitable oven. Thereafter, when the material has cooled to room temperature, the relatively wide "Mylar" sheet is slit into strips which may, for example, be ½ or ¾ of an inch in width to form the tape line base strips 12, and then is wound on reels R. These strips in the thickness range .008–.020 inch have adequate structural strength in themselves to serve as measuring tapes. If the thickness of the strip is substantialy greater than this it is not properly flexible for coiling into most measuring tape casings.

Each strip 12 is drawn from a reel R (FIGURE 3) through elements such as rolls A for applying a pigmented coating 13 which can be any vinyl enamel or epon base paint composition, or any suitable pigmented organosol. The coating is applied only to the top surfaces of the strips 12 in the illustrated embodiments of the invention. An oil modified phenol formaldehyde or alkyd resin colored white by a titanium oxide pigment, which is dissolved in well known solvents for the resin, could also be used. Benzene and turpentine are frequently used solvents for many paints and for vinyl resins ketones or chlorinated hydrocarbons are used. The pigment includes an adhesive material blended therein which is not activated until an elevated temperature is reached. The adhesive is, of course, insoluble in the paint. Preferably, the coating 13, which is set once dried, will contain white pigment particles to provide a suitable background for the numerals and graduations 10 and 11, respectively, which are printed thereon when the coating 13 has dried. It will be desirable to dry the coating 13 in a drying oven such as at O, but the oven is maintained at a low temperature below 50° C. which does not deleteriously affect the heat set strips 12.

The graduations 10 and 11 are next imprinted by means of conventional printing rolls B or the like with conventional blank ink of a fast drying nature, which once dried is set. The graduations can also be oven dried at a low temperature below 50° C. in an oven O' and preferably contain the same adhesive material. The adhesive used becomes tacky only at elevated temperatures above about 300° F. Du Pont adhesive No. 46960, set by Du Pont curing agent No. RC805, may be adhesive dispersed in the pigment and ink but many others are commercially available.

Figure 4:
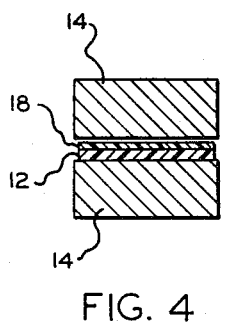
FIGURE 4 is a transverse sectional view thereof taken on the line 4—4 of FIGURE 3.
Figure 3:
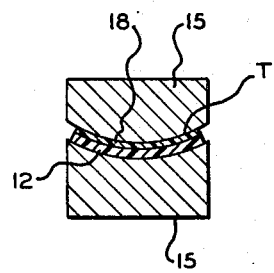
FIGURE 3 is a schematic side elevational view of processing apparatus for forming the tape including mandrels for heat setting a transverse curvature in the tape.
Figure 3:
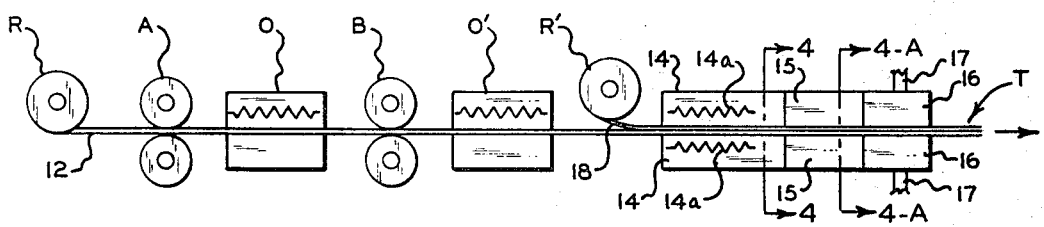

A transparent "Mylar" film strip 18 on the order of .004–.010 of an inch in thickness which has been stretched and heat set in the same manner as strip 12 is then adhesively bonded on the top surface of the strip 12, as shown in FIGURE 2. After the pigment and ink have been applied and dried, the strips are ready for receiving the top coating 18 and to undergo a heat setting operation. This is accomplished by pulling each line 12 and an accompanying strip 18 from a reel R' between elongate, heated upper and lower mandrels 14 preferably having electrical elements 14a as shown in FIGURES 3 and 4 which heat the strips 12 to a temperature such that dies 16 can heat set a transverse curvature in them. It has been determined that, if heated to temperatures approaching the temperature at which they were heat set in stretched condition, the tapes will be brittle when cooled to room temperature. It was noted that this was the case if heating was carried substantially beyond 420° F.

The tapes are preferably drawn slowly between the elongate mandrels 14 at a rate of speech such as to heat the tapes as rapidly as possible to the desired heat setting temperature (375°–410° F.) so that they can be set in a transverse curvature by the dies 15. This temperature activates the adhesive in the pigment 13 and ink graduations 10 and 11 so that the film 18 bonds to the strips 12 shortly after the two enter dies 15. The dies 15 are relatively short in length in comparison to the length of mandrels 14, which freely passes the tape, so that little frictional pull is exerted on the relatively plastic strip as it passes through the curvilinear die surfaces. Once the strip is heat set in a state of curvature it is immediately chilled to 30°–50° F. in hollowed dies 16 which preferably have coolant tubes 17 connected to a source of fluid coolant. The length of the dies 16, which have the same transverse curvature, is also minimal relative to mandrels 14 to reduce frictional drag on the tapes.

While "Mylar" strips are preferred, various thermoplastic, synthetic, plastic materials may be used in fashioning a tape according to the invention. The material should be heat set in a longitudinally stretched condition such that when it is at or near room temperature it has measuring tape dimensional stability; that is, it will not elongate or shrink .08%.

*Example 1.*—A strip of "Mylar" polyester film which has been stretched biaxially and heat set in stretched condition at a temperature of 200° C. is provided on the reel R. The strip is ¾ of an inch in width and .010 of an inch in thickness. It is drawn through pigmenting rolls A wherein the top roll A is saturated with paint comprising an oil modified phenol formaldehyde resin colored white by titanium oxide pigment dissolved in toluol solvent and including Du Pont adhesive No. 46960 with curing agent No. RC805 dispersed therein in the ratio of 30 parts adhesive to one part curing agent by weight. The strip passes to the drying oven O, which has electrical heating elements maintaining an oven temperature of 50° C., which dries the pigmented coating and sets it so that it will not flow, even through its temperature is later raised to as much as 420° F. The printing rolls B then print graduations and numerals on the pigmented coating of the tape, the ink comprising the same paint with black pigment, which also, once dried in an oven O' at 50° C., will not run even though a temperature of 450° F. is reached. The ink also contains Du Pont adhesive No. 46960 and Du Pont curing agent No. RC805 in the same ratio. From the oven O' the tape passes to heating mandrels 14 which heat it substantially above 150° C. (302° F.) preferably to 375° F. The film strip 18 of ¾ inch in width and .005 of an inch in thickness is passed through the mandrels 14 adjacent the upper surface of the processing strip and similarly is heated to 375° F. At this temperature the strips 12 and 18 enter dies 15 and 17 which bond them together, due to the activation of the adhesive, at about 375° F. and form and heat set a transverse curvature in them. The formed tape line then passes to chilling dies 16 which chills it through substantially immediately to 40° F.

*Example 2.*—The process is practiced according to Example 1 except that no protective film strip 18 is passed through mandrels 14 and dies 15 and 16, the finished tape omitting such a protective strip.

*Example 3.*—The process according to Example 1 in which both film strips 12 and 18 are "Teflon" (polytetrafluoroethylene), rather than "Mylar," in a thickness of .008 inch, and the heat setting temperature for setting the transverse curvature is 475° F. The biaxial stretching is accomplished at 100° C. and the dimensional stability is heat set in the plastic immediately following stretching at 265° C.

Figure 5:
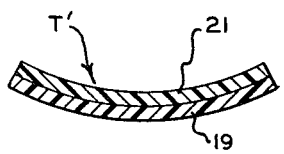
FIGURE 5 is a transverse sectional view through a modified tape line.

In FIGURE 5 I have shown a modified embodiment of the invention in which a ¾" wide "Mylar" film strip 19 of .008 of an inch thickness is extruded with pigment particles therein so that it has a white or yellow color upon extrusion. After it has cooled and solidified it is stretched and heat set as indicated previously at a temperature in the range 200°–250° C. for several minutes. Thence, indicia in the form of graduations and numerals 20 and 20a, respectively, are imprinted directly on the pigmented "Mylar" strip 19 and a transparent "Mylar" strip 21 of substantially the same thickness, .007 of an inch, which has been similarly stretched and heat set in stretched condition is bonded to the strip 19 with a suitable transparent adhesive. The adhesive may be applied by passing the strip 19 through rolls (such as at A) which apply an adhesive coat to its lower face. Finally, the laminated tape T' of FIGURE 5 is passed between the mandrels 14 and dies 15 and 16 of FIGURES 4A and 3 and heat set in concavo-convex form at a temperature less than that used to heat set the longitudinal stretch in the tape line laminations 19 and 21 and less than that which would deleteriously affect the adhesive. The temperature for heat setting the curvature in the tape line T' may be about 180° C. The tape T' formed is more rigid in nature.

Alternatively to imprinting the graduations 20 and numerals 20a on the strip 19 they may be printed on the side of transparent strip 21 which bonds to strip 19 in such form that they read in the same manner as though imprinted on strip 19. Except for the differences noted, the method of forming is the same as set forth in Example 1. The two strips could both be "Teflon" (polytetrafluoroethylene) strips, "Kel F" strips (polychlorotrifluoroethylene), or another plastic which is heat set in a state of dimensional stability.

It is preferred that the printing step precede concaving, in view of the difficulty of printing a concave surface accurately. However, it is thought a strip could be formed exactly as in Examples 1–3 with the strip leading from reel R directly to the mandrels 14 and dies 15 and 16. In this modified process the film 18 would be applied after a printing step which contemplates passing the cooled concaved strip 12 between cylindrical rollers to flatten it out and printing it in flattened condition prior to permitting the strip to snap back to concave shape.

In a still further embodiment of the invention the step of passing the strips through dies 15 may be eliminated. A "Mylar" strip 12 of the character described is printed in the manner specified but with a thermosetting pigment and ink which may not include an adhesive additive and the "Mylar" strip 18 is stretched and heat set only in the longitudinal direction in the manner indicated. The strip 12, once the pigment and ink is dried and thermoset, is then coated with a thermosetting adhesive such as Du Pont polyester adhesive 46950 and heated to the adhesive activation temperature of about 260°–280° F. If strip 18 is then joined to it, and the adhesive dried, the transparent strip 18 will be permanently joined to the pigmented and printed upper surface of strip 12. Thence the joined strips 12 and 18 are passed through an oven to the heat setting temperature (below the temperature which would affect the dimensional stability set in and brittle the strips) for strips 12 and 18 (375°–410° F.) and upon subsequent curing the strip 18 will shrink transversely to place the transverse curvature in the joined strips 12 and 18 so that the tape shown in FIGURE 2 or 5, dependent on the thickness of the strip 18, is formed. Strips 12 and 18 could be formed of "Teflon" or "Kel F" plastic, in which case the heat setting temperature for shrinking the strip 18 transversely will be that used for setting the transverse curvature with dies 15. Also, the thermosetting background and indicia could be applied to the strip 18, rather than to strip 12, either before or after it is joined to strip 12, and may be a pigmented polyester. If the background and indicia are applied to the exposed top surface of strip 18 after strip 18 is joined to strip 12, it is preferable to apply them prior to the time the transverse curvature is assumed. Other suitable polyester adhesives for mixture with the pigment and ink as described or for subsequent coating of a pigmented and printed surface are available, such as Du Pont adhesive 46950. Curing at room temperatures would take several days, so heat curing is preferred. The polyester class of adhesives is chemically similar to the "Mylar" (polyester) strips and these adhesives have exceptional adhesion to it but other adhesives, such as Du Pont vinyl adhesive 54046, and modified synthetic rubber types, such as Du Pont adhesive 4684, are available.

By following the teachings of the invention, a dimensionally stable measuring tape can be produced in a most inexpensive manner. It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. A semi-rigid, coilable measuring tape comprising an elongate strip of thermoplastic, plastic film, about .008–.020 of an inch in thickness and capable of being heat set at an elevated temperature in a condition of stretch and in a concavo-convex transverse configuration, stretched lengthwise and heat set in stretched condition, said tape being heat set also in concavo-convex form; and graduations for said tape running lengthwise thereof.

2. The combination defined in claim 1 in which said plastic is polyethylene terephthalate film.

3. The combination defined in claim 1 in which a laminate of transparent film on the order of .005 of an inch in thickness is adhesively bonded over said graduations.

4. A method of making a semi-rigid, coilable tape comprising; heating an imprinted elongated, narrow film strip which has dimensional stability and is in the thickness range of about .008–.020 of an inch; said strip being capable of being heat set in a concavo-convex transverse configuration; forming a transverse curvature in said strip to provide the tape with a concavo-convex cross section; and heat setting said strip with this curvature and cooling it below a temperature at which it is deformable.

5. The method defined in claim 4 in which said strip comprises a laminate.

6. The method defined in claim 4 in which said strip is formed with said curvature by die means and said strip and die means have relative lengthwise movement.

7. The method defined in claim 4 in which said strip is heat set in a state of lengthwise linearity while being heat set in a transverse curvature.

8. A method of making a semi-rigid, coilable measuring tape comprising; heating an elongated, narrow film strip in the thickness range of about .008–.020 of an inch which has been stretched lengthwise, and heat set in said stretched condition to a deformable state; said strip being also capable of being heat set at an elevated temperature in a concavo-convex configuration; shaping said strip in a constricted space to cause it to assume a transverse concavo-convex form; relatively moving said space and tape while heat setting said strip in this form and cooling it below a temperature at which it is deformable; and applying measuring graduations.

9. The method defined in claim 8 in which said graduations are applied by bonding a laminate having graduations to said strip.

10. The method defined in claim 8 in which said strip is polyethylene terephthalate and heat setting of the strip in a stretched condition is accomplished at a temperature above 200° C.; and the heat setting of the curvature is accomplished at a temperature below 200° C.

11. The method defined in claim 8 in which said strip is passed through die means having a heated section.

12. The method defined in claim 8 in which said strip is heat set in a state of lengthwise linearity while being heat set in a transverse curvature.

References Cited

UNITED STATES PATENTS

| 1,964,248 | 6/1934 | Buck et al. | 33—137 |
| 2,659,153 | 11/1953 | Beeber | 33—137 |
| 2,823,421 | 2/1958 | Scarlett | 264—289 |
| 2,897,546 | 8/1959 | Clapp et al. | 264—339 |
| 2,975,484 | 3/1961 | Amborski | 264—289 |
| 2,994,958 | 8/1961 | Beeber | 33—137 |
| 3,121,957 | 2/1964 | Brown | 33—137 |

SAMUEL S. MATTHEWS, *Primary Examiner.*